(12) United States Patent
Ikeda

(10) Patent No.: US 11,178,337 B2
(45) Date of Patent: Nov. 16, 2021

(54) IMAGE CAPTURING APPARATUS, METHOD OF CONTROLLING THE SAME, AND NON-TRANSITORY COMPUTER READABLE STORAGE MEDIUM FOR CALCULATING A DEPTH WIDTH FOR AN OBJECT AREA BASED ON DEPTH INFORMATION

(71) Applicant: CANON KABUSHIKI KAISHA, Tokyo (JP)

(72) Inventor: Kensei Ikeda, Kunisaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/937,174

(22) Filed: Jul. 23, 2020

(65) Prior Publication Data

US 2021/0037190 A1 Feb. 4, 2021

(30) Foreign Application Priority Data

Jul. 29, 2019 (JP) .............................. JP2019-138958

(51) Int. Cl.
*H04N 5/222* (2006.01)
*H04N 5/232* (2006.01)

(52) U.S. Cl.
CPC ... *H04N 5/232945* (2018.08); *H04N 5/23219* (2013.01); *H04N 5/232127* (2018.08)

(58) Field of Classification Search
CPC ...................... H04N 5/232945; H04N 5/23219
USPC .................................................... 348/333.03
See application file for complete search history.

(56) References Cited

U.S. PATENT DOCUMENTS

| 10,469,730 | B2* | 11/2019 | Kano | H04N 5/232122 |
| 2012/0007997 | A1* | 1/2012 | Oikawa | G03B 17/18 |
| | | | | 348/208.6 |
| 2012/0249846 | A1* | 10/2012 | Nishio | H01L 27/14623 |
| | | | | 348/294 |
| 2013/0335618 | A1* | 12/2013 | Sugawara | G06F 3/04847 |
| | | | | 348/349 |
| 2014/0267869 | A1* | 9/2014 | Sawa | H04N 5/232939 |
| | | | | 348/333.03 |
| 2016/0381305 | A1* | 12/2016 | Matsuoka | G06T 5/002 |
| | | | | 348/239 |
| 2017/0028648 | A1* | 2/2017 | Asano | G06T 19/20 |

(Continued)

FOREIGN PATENT DOCUMENTS

JP 2018-067802 A 4/2018

*Primary Examiner* — Usman A Khan
(74) *Attorney, Agent, or Firm* — Canon U.S.A., Inc. IP Division

(57) ABSTRACT

An apparatus having a focusing unit for focusing in relation to an area within an angle of view, detects, from a captured image, an object area in which a specific object is present, calculates a depth width for the object area based on depth information indicating a defocus distance to an object for each portion obtained by dividing the image, and controls a display so as to, if the depth width is greater than or equal to a predetermined value, superimposedly display, on the image, an object detection frame for indicating the object area and an AF frame for indicating an AF location that the focusing unit uses, and, if the depth width is less than a predetermined value, superimposedly display the object detection frame, and not superimposedly display the AF frame.

19 Claims, 6 Drawing Sheets

(56) References Cited

U.S. PATENT DOCUMENTS

| | | | | |
|---|---|---|---|---|
| 2017/0171459 A1* | 6/2017 | Ogawa | ................... | G02B 7/285 |
| 2017/0201674 A1* | 7/2017 | Yamamoto | ......... | H04N 5/23293 |
| 2017/0289441 A1* | 10/2017 | Zhang | .................. | G06K 9/6202 |
| 2017/0353654 A1* | 12/2017 | Kato | ................... | H04N 5/23258 |
| 2018/0196221 A1* | 7/2018 | Sun | .......................... | G02B 7/28 |
| 2019/0373202 A1* | 12/2019 | Onuki | ................ | H04N 5/23212 |

\* cited by examiner

FIG. 2

IMAGE CAPTURING APPARATUS, METHOD OF CONTROLLING THE SAME, AND NON-TRANSITORY COMPUTER READABLE STORAGE MEDIUM FOR CALCULATING A DEPTH WIDTH FOR AN OBJECT AREA BASED ON DEPTH INFORMATION

BACKGROUND OF THE DISCLOSURE

Field of the Disclosure

The aspect of the embodiments relates to an image capturing apparatus such as a digital camera or a digital video camera, a method of controlling the same, and a non-transitory computer readable storage medium.

Description of the Related Art

It has become common to provide an object detection function in digital cameras of recent years. The digital camera detects an object from within a captured image by using the object detection function which enables it to obtain a more favorable image by aligning focus or exposure to the detected object. In such a case, the digital camera clearly indicates the detected object to a user by superimposing a frame (detection frame) in relation to the detected face or physical object.

The size of the detection frame may increase depending on the scene to be captured. When the detection frame is large, there are cases in which the user will not understand where in the frame is being focused. Accordingly, when an auto focus (hereinafter, AF) frame is superimposed in order to clearly indicate an area being focused, the number of displayed frames increases and the screen becomes complicated. For this reason, it is important to both suppress the complexity of the screen due to displayed frames and clearly indicate a detected object or focus location to a user. In Japanese Patent Laid-Open No. 2018-067802, it is recited that, after a focus frame is displayed, the display form of the focus frame changes in accordance with detection of a face and a focus frame for the face is displayed such that the expression of the face becomes easy to see. Japanese Patent Laid-Open No. 2018-067802 proposes, in a case where a face of a person is detected, conveying to a user that a detected object has good visibility by changing the display form of the detection frame.

However, in a case where a frame (focus frame) indicating the focus location is displayed according to the face size when a face of a person is detected as in the technique disclosed in Japanese Patent Laid-Open No. 2018-067802, there are cases where the user is inconvenienced when they do not know where, in a focus frame corresponding to the face size, the frame is being focused. For example, in a case where a background is included within the focus frame, it cannot be determined whether focus is aligned to the background or focus is aligned to an object from the display of the focus frame.

SUMMARY DISCLOSURE

According to one aspect of the embodiments, there is provided an apparatus, comprising: a focusing unit configured to perform focusing in relation to an area within an angle of view; a detecting unit configured to detect, from a captured image, an object area in which a specific object is present; a calculating unit configured to calculate a depth width for the object area based on depth information that indicates a defocus distance to an object for each portion, the portions obtained by dividing the image; and a superimposing unit configured to control a display so as to, in a case where the depth width is greater than or equal to a predetermined value, superimposedly display, on the image, an object detection frame for indicating the object area and an AF frame for indicating an AF location that the focusing unit uses, and, in a case where the depth width is less than a predetermined value, superimposedly display the object detection frame, and not superimposedly display the AF frame.

According to another aspect of the embodiments, there is provided a method of controlling an apparatus having a focusing unit configured to perform focusing in relation to an area in an angle of view, the method comprising: detecting, from a captured image, an object area in which a specific object is present; calculating a depth width for the object area based on depth information that indicates a defocus distance to an object for each portion, the portions obtained by dividing the image; and controlling a display so as to, in a case where the depth width is greater than or equal to a predetermined value, superimposedly displaying, on the image, an object detection frame for indicating the object area and an AF frame for indicating an AF location that the focusing unit uses to focus, and, in a case where the depth width is less than a predetermined value, superimposedly displaying the object detection frame, and not superimposedly displaying the AF frame.

According to another aspect of the embodiments, there is provided a non-transitory computer-readable storage medium storing a program for causing a computer to execute a control method of an apparatus having a focusing unit configured to perform focusing in relation to an area in an angle of view, the control method comprising: detecting, from a captured image, an object area in which a specific object is present; calculating a depth width for the object area based on depth information that indicates a defocus distance to an object for each portion, the portions obtained by dividing the image; and controlling a display so as to, in a case where the depth width is greater than or equal to a predetermined value, superimposedly displaying, on the image, an object detection frame for indicating the object area and an AF frame for indicating an AF location that the focusing unit uses to focus, and, in a case where the depth width is less than a predetermined value, superimposedly displaying the object detection frame, and not superimposedly displaying the AF frame.

Further features of the disclosure will become apparent from the following description of exemplary embodiments with reference to the attached drawings.

BRIEF DESCRIPTION OF THE DRAWINGS

FIG. 2 is a schematic diagram illustrating an example of a configuration of pixels of the image capturing apparatus.

DESCRIPTION OF THE EMBODIMENTS

Figure 1:
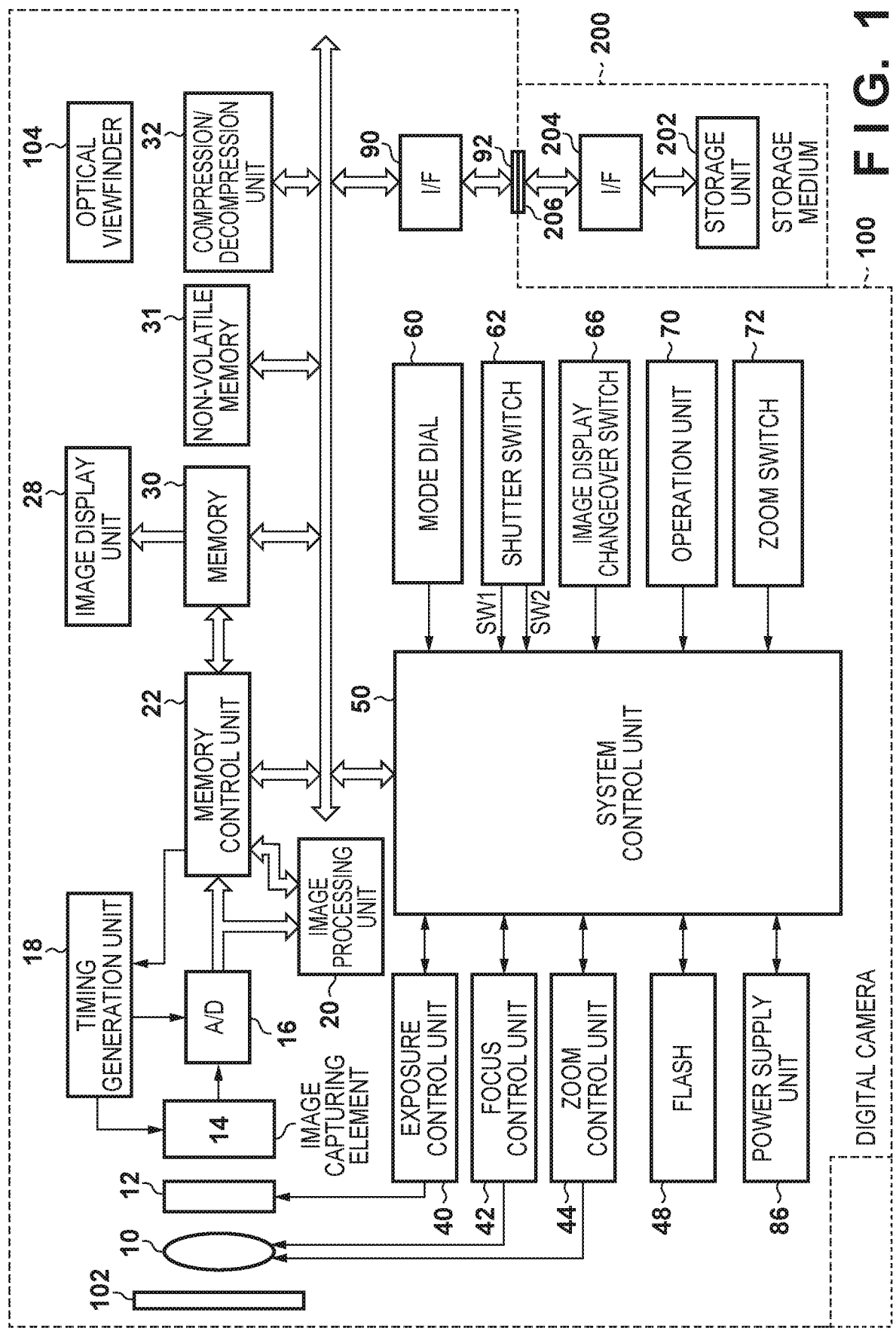
FIG. 1 is a block diagram illustrating an example of a configuration of a digital camera according to an embodiment.

Hereinafter, embodiments will be described in detail with reference to the attached drawings. Note, the following embodiments are not intended to limit the scope of the claimed invention. Multiple features are described in the embodiments, but limitation is not made a disclosure that requires all such features, and multiple such features may be combined as appropriate. Furthermore, in the attached drawings, the same reference numerals are given to the same or similar configurations, and redundant description thereof is omitted.

Hereinafter, although a digital camera is given as an example of an image capturing apparatus according to the aspect of the embodiments, the application of the aspect of the embodiments is not limited to this. For example, it is possible for the aspect of the embodiments to be applied to an information processing apparatus having an image capturing function such as a smart phone or a tablet.

FIG. 1 is a block diagram illustrating an example of a configuration of a digital camera 100 in the embodiment. In the digital camera 100, a mechanical shutter 12 including an image capturing lens 10 and an aperture function configures an optical system. An image capturing element 14 converts an optical image into an electric signal. An A/D converter 16 converts an analog signal outputted from the image capturing element 14 into a digital signal. A timing generation unit 18 supplies a clock signal or a control signal to the image capturing element 14, the A/D converter 16, and the like. The timing generation unit 18 is controlled by a memory control unit 22 and a system control unit 50. Also, the timing generation unit 18 realizes an electronic shutter function for controlling an accumulation time period of the image capturing element 14 by controlling a reset timing of the image capturing element 14. The electronic shutter function is used for moving image capturing and the like.

An image processing unit 20 performs pixel interpolation processing or color-conversion processing for image enlargement/reduction on data from the A/D converter 16 or data from the memory control unit 22 as well as noise reduction processing, edge enhancement processing, and the like. Also, the image processing unit 20 includes a face detecting function for detecting a face area as a specific object from the captured image and an organ detecting function for detecting an organ which is a specific part, such as a pupil, a nose, or a mouth, of a face. Furthermore, the image processing unit 20 also performs processing and the like for calculating a trust level which indicates the probability of a result of face detection or organ detection.

The image processing unit 20 saves feature data (template) denoting a shape of the outline portion of a face in the face detecting function and specifies, within an image, an image region that matches feature data by template matching processing. Also, the image processing unit 20 calculates the trust level of face detection by calculating a degree of matching with the feature data. Also, in order to increase facial detection opportunities and enhance detection accuracy, the image processing unit 20 may perform the template matching processing by using a plurality of feature data and prepare feature data of a part of a face shape to use the results of performing the template matching processing. Also, in order to detect a face independent of the face size, the image processing unit 20 may cause the size of the feature data to change when performing the template matching processing.

The image processing unit 20 saves feature data (a template) denoting a shape of an organ in the organ detecting function and specifies by template matching processing an image region, within an area obtained by the face detecting function, that matches with the feature data of the organ. Also, the image processing unit 20 calculates the trust level of organ detection by calculating a degree of matching with the feature data of the organ. Note, although face detection and organ detection is realized in the present embodiment by template matching processing in which feature data is used, there is no limitation to this. Other methods may be used as long as detection of a face area or an area of an organ and calculation of a trust level is possible.

Also, the image processing unit 20 includes a physical object detecting function for detecting a specific object other than a face. For example, a vehicle, a building, or a pet (such as a dog or cat) can be given as a detected physical object. The physical object detecting function uses feature data (template) denoting a shape of a physical object to perform detection by template matching.

Also, in order to perform automatic white balance (hereinafter, referred to as AWB) processing, the image processing unit 20 performs predetermined computational processing by using captured image data and calculates the obtained computation result as a white balance (hereinafter, referred to as WB) evaluation value. Also, the image processing unit 20 performs color conversion and the like on the image data based on the calculated WB evaluation value. Furthermore, in order to perform automatic exposure (hereinafter, referred to as AE) control processing and electric flash exposure (hereinafter, referred to as EF) control processing, the image processing unit 20 performs predetermined computational processing by using captured image data for calculating an AE evaluation value and an EF evaluation value. The system control unit 50 controls an exposure control unit 40 in accordance with a predetermined algorithm based on the obtained AE evaluation value and EF evaluation value.

The memory control unit 22 controls the A/D converter 16, the timing generation unit 18, the image processing unit 20, a memory 30, and a compression/decompression unit 32. Data outputted from the A/D converter 16 is written to the memory 30 via the image processing unit 20 and the memory control unit 22 or via the memory control unit 22 directly.

An image display unit 28 includes a TFT LCD (thin-film-transistor liquid-crystal display) or the like. The image display data written to the memory 30 is displayed by the image display unit 28 via the memory control unit 22. If captured image data is consecutively displayed by using the image display unit 28, an electronic viewfinder function can be realized. Also, the image display unit 28 can freely turn the display on and off according to an instruction of the system control unit 50. In a case where the display of the image display unit 28 is turned off, it is possible to significantly reduce power consumption of the digital camera 100.

The memory 30 stores captured still images and moving images. The memory 30 is provided with a sufficient amount of storage to store a predetermined number of still images or a predetermined time of moving images. By this, even in a case of continuous capturing in which a plurality of still images are sequentially captured, high-speed and large-volume image writing can be performed on the memory 30. Furthermore, the memory 30 can also be used as a work area for the system control unit 50 or as an area for temporarily storing feature data for authentication.

A non-volatile memory 31 is configured by a Flash ROM or the like. Program code to be executed by the system control unit 50 is stored in the non-volatile memory 31. The system control unit 50 includes one or more processors for example, and realizes various processing by consecutively reading and executing program code stored in the non-volatile memory 31. Also, an area for storing feature data of a face for authentication as dictionary data, an area for storing system information, and an area for storing user setting information is provided within the non-volatile memory 31, and thereby various information and settings can be read out and restored upon a subsequent activation. The compression/decompression unit 32 performs compression/decompression of image data by adaptive discrete cosine transform (ADCT) or the like. The compression/decompression unit 32 performs compression processing or decompression processing by reading an image stored in the memory 30 and writes data on which processing has completed to the memory 30.

The exposure control unit 40 controls the mechanical shutter 12 including an aperture function. Also, the exposure control unit 40 performs flash dimming by coordinating with a flash 48 (a flash dimming function). A focus control unit 42 controls focusing of the image capturing lens 10. A zoom control unit 44 controls zooming of the image capturing lens 10. The flash 48 performs light emission modulated by the flash dimming function which is under the control of the exposure control unit 40.

The system control unit 50 controls the entire the digital camera 100. For example, the system control unit 50 performs auto focus processing (hereinafter, referred to as AF) based on pixel data obtained from the image capturing element 14. AF is an auto focus detection in which an object area selected by a user or an object area set automatically by the camera is set as a focus detection region and in which a focal position is detected. The system control unit 50 controls the exposure control unit 40 and the focus control unit 42 by using a TTL method based on the computation result obtained by the image processing unit 20 computing captured image data. Note, although the image processing unit 20 and the system control unit 50 are indicated separately in FIG. 1, configuration may be taken such that the system control unit 50 realizes a portion or all of the functions of the image processing unit 20.

The image capturing element 14 is configured by a C-MOS sensor and peripheral circuits thereof, and one photoelectric conversion element is arranged on each of the light receiving pixels of m pixels in the horizontal direction and n pixels in the vertical direction. The image capturing element 14 is configured such that independent output for all pixels is possible. Also, some of the pixels are focus detecting pixels and AF of an imaging plane phase difference detection method (imaging plane phase difference AF) is possible.

Figure 2:
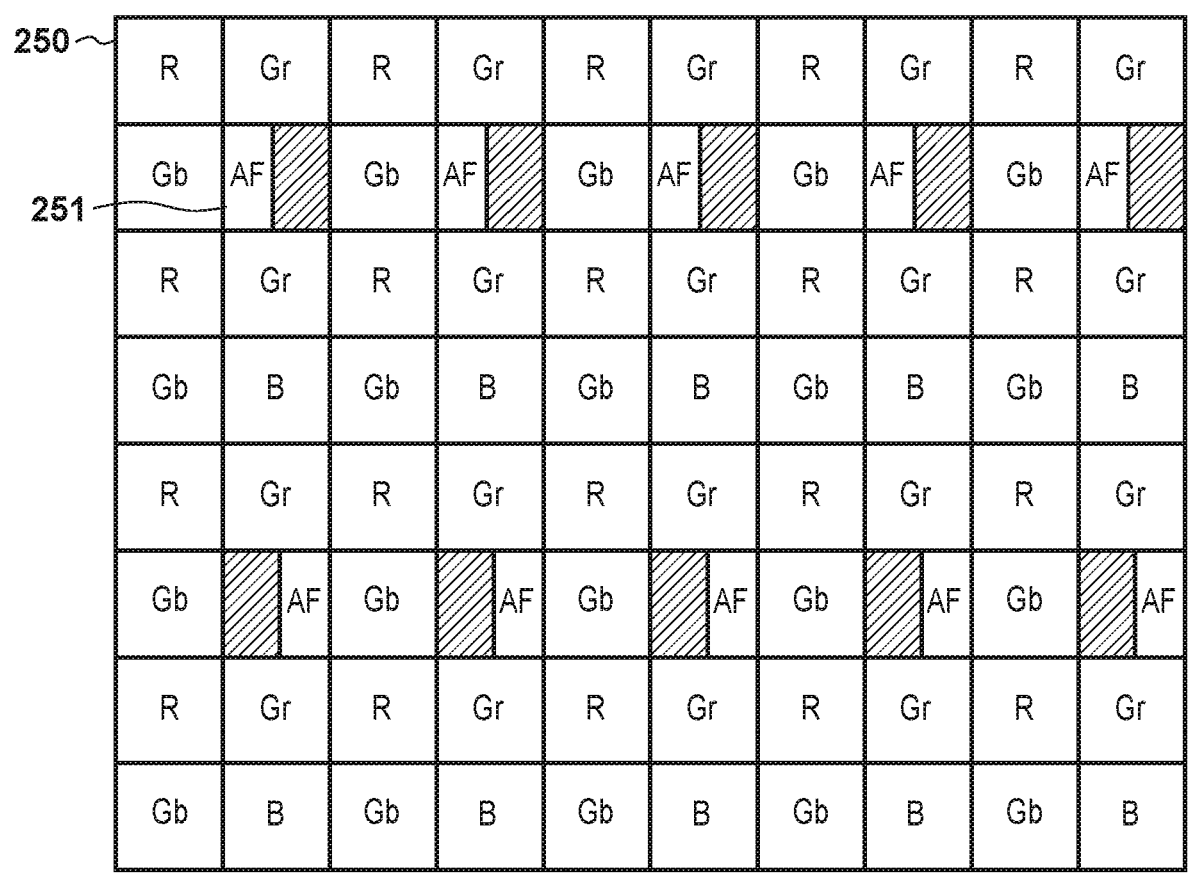

Specifically, as illustrated in FIG. 2, the image capturing element 14 includes a plurality of image forming pixels 250 each of which receive light beams that pass through the entire area of an exit pupil of the image capturing optical system for forming an image of an object, to generate an image of the object. Also, the image capturing element 14 further includes a plurality of focus detecting pixels 251 each of which receive light beams that pass through an area of different exit pupils of the image capturing optical system. The plurality of the focus detecting pixels can receive light beams that pass through the entire area of an exit pupil of the image capturing optical system as a whole. For example, in the image capturing element 14, in a case where 2×2 pixels include the focus detecting pixels, a pair of G pixels arranged diagonally remain as image forming pixels and either the R pixel or the B pixel is substituted with the focus detecting pixel. FIG. 2 is an example in which the B pixel is substituted with the detection pixel.

The system control unit 50 performs focal point detection processing by a phase difference AF method in accordance with the image capture signal of the focus detecting pixels 251 embedded in the image capturing element 14. More specifically, the system control unit 50 performs focus detection based on a defocus amount of a pair of images formed by the focus detecting pixels 251 in accordance with the light beams that pass through a pair of pupil areas of the image sensing optical system. Note, in the present embodiment, although the imaging plane phase difference AF is realized by substituting a portion of the image forming pixel array arranged on the imaging plane with the focus detecting pixels 251, the aspect of the embodiments is not limited to this method. Any configuration may be used as long as focus detection can be performed, and phase difference type focus detection using a known focus detection dedicated sensor, a known contrast-type focus detection, or the like may be used, for example.

A mode dial 60, a shutter switch 62, an image display changeover switch 66, an operation unit 70, and a zoom switch 72, are operation members for inputting various operation instructions to the system control unit 50. These operation members for inputting operation instructions can be configured by combining one or a plurality of switches or dials, touch panels, pointing by a sight line detection, a speech recognition apparatus, or the like.

The mode dial 60 switches and sets each function mode such as power off, automatic image capturing mode, image capturing mode, panorama image capturing mode, moving image capturing mode, playback mode, and PC connection mode. The shutter switch 62 includes a switch for outputting a SW1 signal which is turned on during operation of a shutter button and a switch for outputting a SW2 signal which is turned on when operation of the shutter button completes. A start of an operation such as AF processing, AE processing, and AWB processing is instructed by the SW1 signal. Image capturing processing starts by the SW2 signal.

In the image capturing processing, the following series of operations including exposure and development are performed. Firstly, the exposure control unit 40 controls the shutter 12 to start exposure of the image capturing element 14, and ends exposure to the image capturing element 14 by performing light-shielding as the same time as the end of the exposure duration determined by the AE processing. Note, in a case of flash image capturing, the exposure control unit 40 starts exposure to the image capturing element 14 after pre-flash emission processing for EF by using the flash 48 is performed, and causes the flash 48 to emit light during the exposure duration. When exposure to the image capturing element 14 has ended as described above, a series of processes such as read processing, developing processing, and storage processing is performed. In the storage processing, a signal read from the image capturing element 14 is converted into a digital signal by the A/D converter 16 and is written as RAW data to the memory 30 via the memory control unit 22. In the developing processing, the RAW data written to the memory 30 is developed by computation in the image processing unit 20 or the memory control unit 22, compression is performed by the compression/decompression unit 32, and image data is obtained. In the storage processing, the memory control unit 22 writes the RAW data and/or the image data to a storage medium 200.

The image display changeover switch 66 switches the display of the image display unit 28. By this function, when image capturing is performed by using an optical viewfinder 104, it is possible to achieve power saving due to the supply of electric current to the image display unit 28 being interrupted. The operation unit 70 includes various buttons, a touch panel or a rotary dial, and the like. The operation unit 70 includes a menu button, a set button, a macro button, a multi-screen playback page break button, a flash setting button, a single/continuous/self timer switching button, and the like, for example. Also, the operation unit 70 includes a menu movement + (plus) button, a menu movement − (minus) button, a playback image movement + (plus) button, a playback image movement − (minus) button, an image capturing quality selection button, an exposure correction button, a date/time setting button, and the like, for example.

The zoom switch 72 is a switch for a user to perform an instruction to change the scale factor of an image to be captured. The zoom switch 72 includes a tele switch for causing the angle of view to change in a telephoto direction and a wide switch for causing the angle of view to change in a wide-angle direction. The user can instruct a change of the angle of view of the image capturing lens 10 to the zoom control unit 44 by using the zoom switch 72. This instruction is a trigger for the zoom control unit 44 to perform an optical zoom operation. Also, an instruction from the zoom switch 72 is also a trigger for cropping of the image by the image processing unit 20 or a trigger for a change in electronic zooming of the angle of view by pixel interpolation processing or the like. A power supply unit 86 includes a primary battery such as an alkali battery, a secondary battery such as a NiCd battery, a NiMH battery, or a Li-ion battery, and an AC adapter.

An interface 90 is an interface for connecting a storage medium such as a memory card or a hard disk. A connector 92 connects the interface 90 with a storage medium such as a memory card or a hard disk. A protective member 102 is a barrier for preventing dirtying or breakage of the image capturing unit by covering the image capturing unit including the image capturing lens 10 of the digital camera 100. With the optical viewfinder 104, image capturing can be performed by using only an optical viewfinder without using the electronic viewfinder function of the image display unit 28. The storage medium 200 is a memory card or hard disk, for example. The storage medium 200 includes a storage unit 202 configured from a semiconductor memory or magnetic disk, an interface 204 with the digital camera 100, and a connector 206 for connecting to the digital camera 100.

Figure 3:
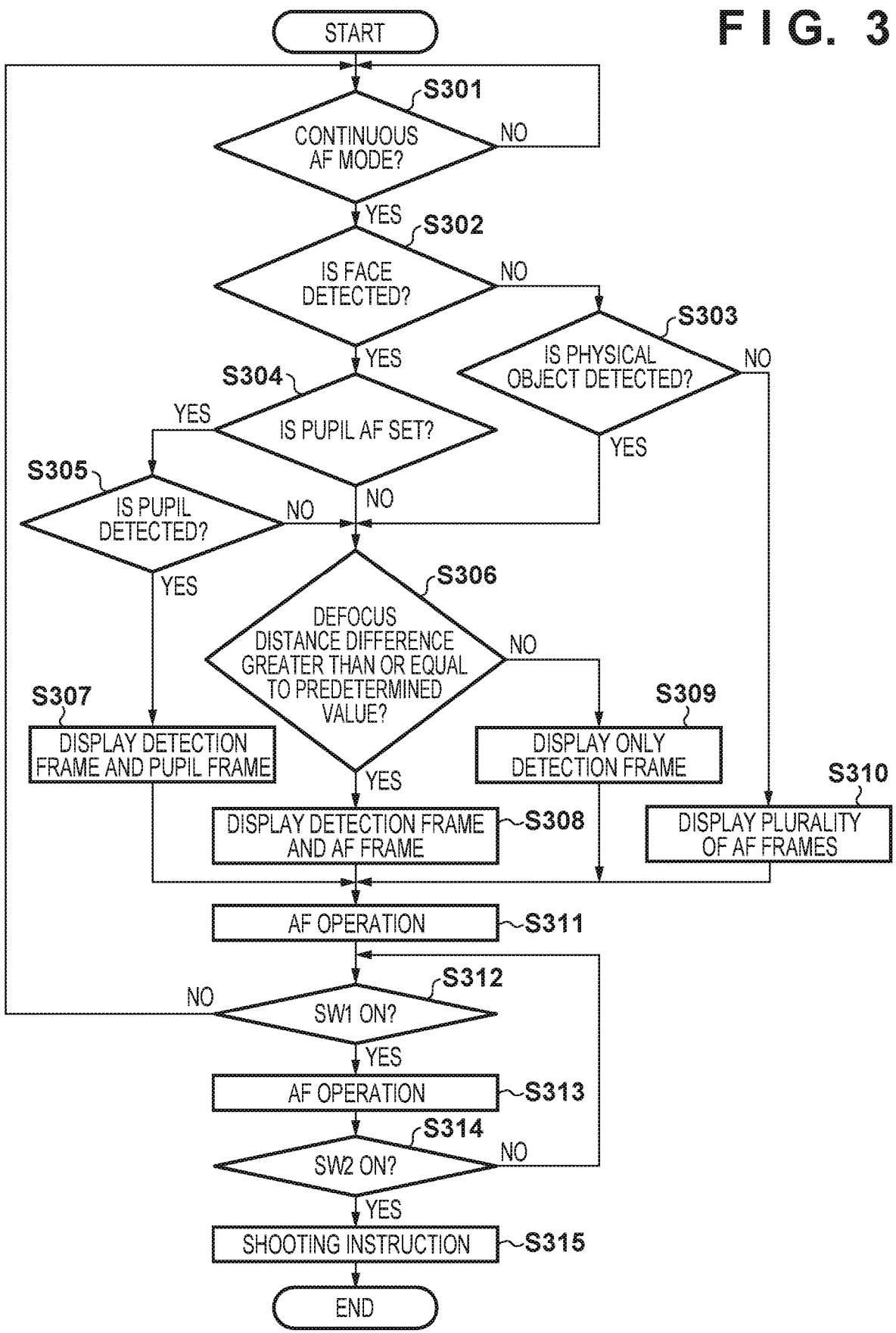
FIG. 3 is a flowchart for describing an image capturing operation of the digital camera according to the embodiment.

Next, description regarding an image capturing operation by the digital camera 100 of the present embodiment is given by using FIG. 3. FIG. 3 is a flowchart for describing an image capturing operation of the embodiment. The system control unit 50 functions as a focus unit for performing focus on an arbitrary area within the angle of view by using the focus control unit 42. The system control unit 50, in a shooting standby state, sets a focus detection region (in-focus area) within the angle of view from a captured image (a live view image, for example) and performs focus detection based on the signal obtained from the area of the image capturing element corresponding to the set focus detection region. In this way, the system control unit 50 realizes a continuous AF mode which is described below.

In step S301, the system control unit 50 determines whether or not the AF mode is a continuous AF mode. The continuous AF mode is a mode in which the system control unit 50 repeats focal point detection processing and a driving control of the focus lens in order to continue alignment of focus to an object at all times during a live-view display. In other words, in the continuous AF mode, the system control unit 50 consecutively executes a focusing operation by using an AF location selected from the object detection frame of images sequentially captured in the shooting standby state. If it is not the continuous AF mode (NO in step S301), processing returns to step S301, and if it is the continuous AF mode (YES in step S301), the processing advances to step S302.

In step S302, the system control unit 50 determines whether or not a face is detected by the face detecting function of the image processing unit 20 in the image during the live-view display. The system control unit 50 transitions the processing to step S303 in a case where it is determined that a face was not detected (NO in step S302), and transitions the processing to step S304 in a case where it is determined that a face was detected (YES in step S302). In step S303, the system control unit 50 determines whether or not a physical object is detected by the physical object detecting function of the image processing unit 20. The system control unit 50 transitions the processing to step S310 in a case where it is determined that a physical object was not detected (NO in step S303), and transitions the processing to step S306 in a case where it is determined that a physical object was detected (YES in step S303). Meanwhile, in step S304, the system control unit 50 determines whether or not pupil AF is set to the in-focus area. Setting of the pupil AF is designated by the user operation via the operation unit 70. The system control unit 50 transitions the processing to step S305 in a case where it is determined that the pupil AF is set (YES in step S304), and transitions the processing to step S306 in a case where it is determined that the pupil AF is not set (NO in step S304).

In step S305, the system control unit 50 determines whether or not a pupil of a main face is detected by the organ detecting function of the image processing unit 20. In the present embodiment, a main face is the face of a main object. In a case where a plurality of faces are detected, the system control unit 50 determines a main face in accordance with the size of the face or the position of the face. The system control unit 50 transitions the processing to step S307 in a case where it is determined that a pupil is detected in the main face (YES in step S305) and transitions the processing to step S306 in a case where it is determined that a pupil is not detected (NO in step S305).

Figure 4:
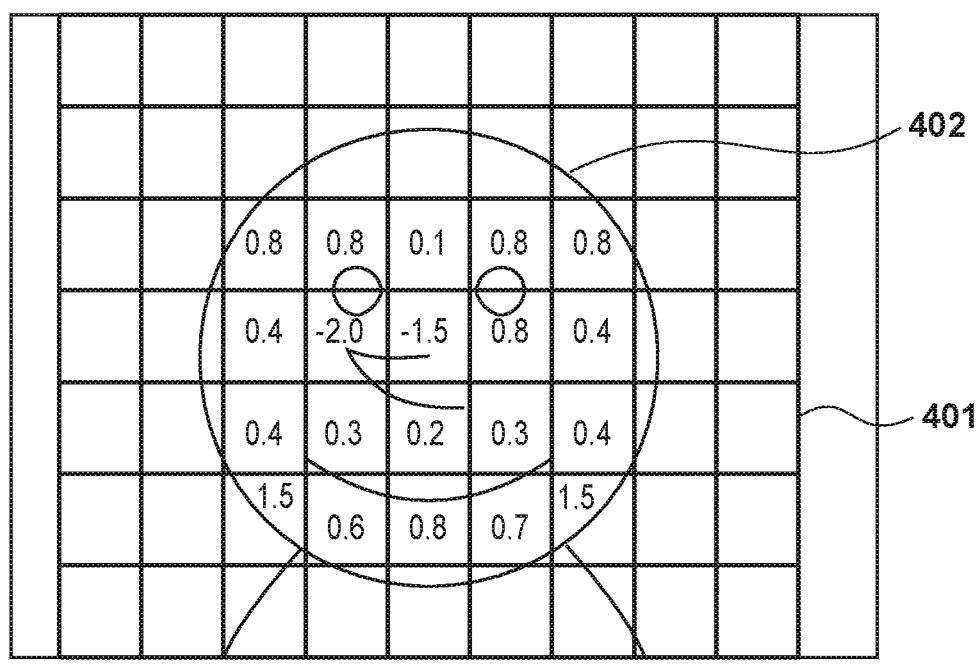
FIG. 4 is a view for describing a defocus map.

In step S306, firstly, the system control unit 50 generates depth information (defocus map) that indicates a distance (defocus distance) to an object for each portion, the portions obtained by dividing the inside of the angle of view into a plurality of areas. FIG. 4 is a schematic diagram illustrating an example of a defocus map 401 generated by the system control unit 50. The system control unit 50 calculates a depth width (defocus distance difference) based on a difference of the close side and the far side of the object (a main face or physical object) and determines, based on depth information 402 indicated by the generated defocus map 401, whether or not the calculated depth width is greater than or equal to a predetermined value. The system control unit 50 transitions the processing to step S308 in a case where the depth width is determined to be greater than or equal to the predetermined value (YES in step S306) and transitions the processing to step S309 in a case where the depth width is determined to not be greater than or equal to the predetermined value (NO in step S306). Note, the depth width may be a difference of the maximum value and the minimum value of the defocus distance in the object area, and may be a difference of the average of the upper 30% and the average of the lower 30% of a histogram of the defocus distance in the object area, for example.

Figure 5A:
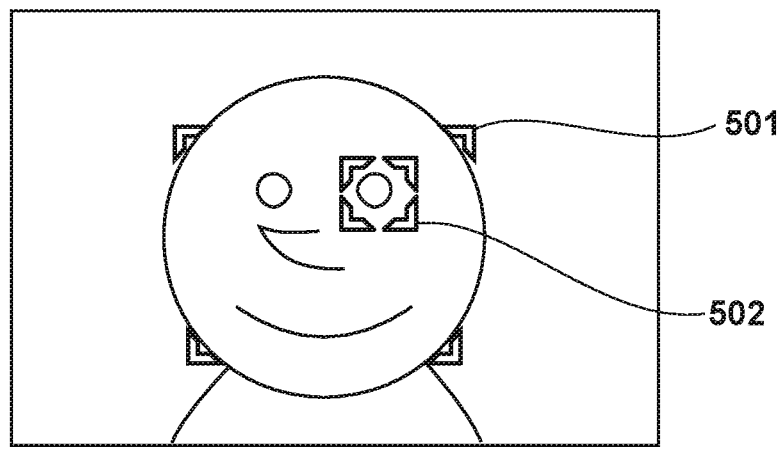
FIGS. 5A through 5C are schematic diagrams illustrating examples of screens in the embodiment.

The pupil AF is set (YES in step S304), and the system control unit 50 displays a detection frame and a pupil frame to the image display unit 28 in step S307 in a case where a pupil is detected on the main face (YES in step S305). FIG. 5A is a view illustrating pupil AF being set and a display state of the image display unit 28 in a case where a face and a pupil is detected. The system control unit 50 displays an object detection frame 501 such that it surrounds the detected face or displays a pupil AF frame 502 such that it surrounds a pupil. The AF location within the pupil AF frame 502 is used as an in-focus area.

The display to the image display unit 28 in step S308 is one of:

(A) A face is detected and pupil AF is set but a pupil cannot be detected;

(B) A face is detected and pupil AF is not set; or (C) A face is not detected and a physical object is detected;

and is a display in a case where the defocus distance difference for the detected object is greater than or equal to the predetermined value. In such a case, the system control unit 50 displays an object detection frame and one or more AF frames on the image display unit 28.

Figure 5B:
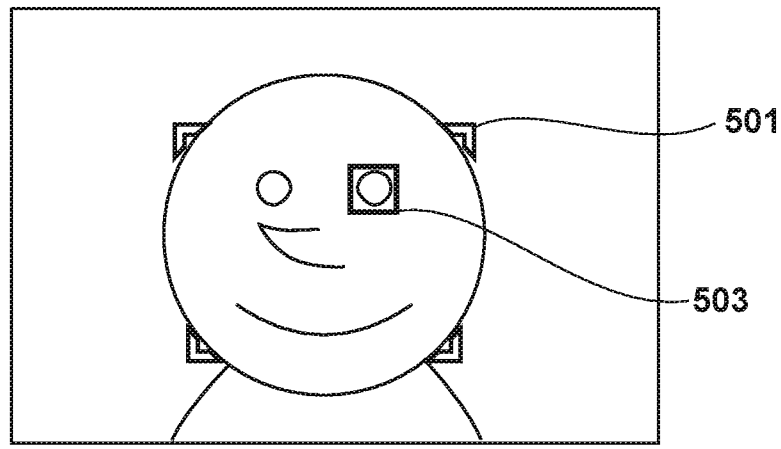
Figure 5C:
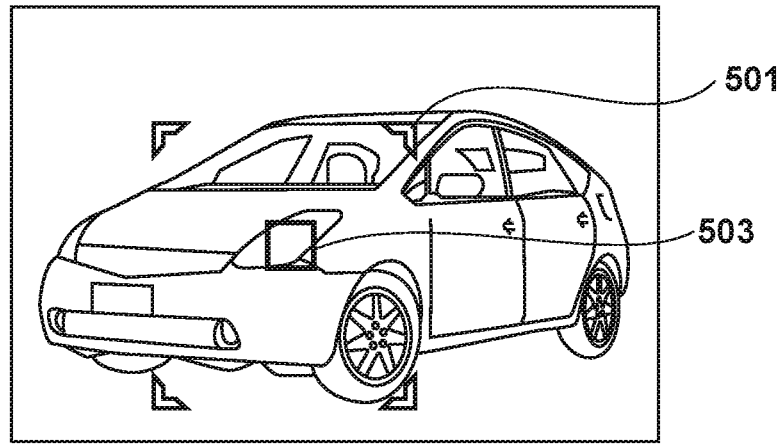

FIG. 5B is an image displayed in the case of the above described (B). The object detection frame 501 is displayed so as to surround the face which is the detected object and an AF frame 503 which indicates the AF location is being displayed. FIG. 5C is an image displayed in the case of the above described (C) and is a view illustrating a state in which the defocus distance difference is greater than or equal to the predetermined value. The object detection frame 501 is displayed so as to surround a portion of a vehicle which is the detected object (physical object) and the AF frame 503 which indicates the AF location is displayed. Note that the AF frame 503 and the pupil AF frame 502 are displayed in different states. The user can see and immediately distinguish the displayed frames.

Note, in step S308, the system control unit 50 selects the AF location closest to the imaging plane from among a plurality of AF locations within the object detection frame 501 and displays the AF frame which corresponds to this. In a case where there are a plurality of AF locations determined to be closest to the image plane, the system control unit 50 selects one or more AF frames to be displayed from the plurality of AF frame candidates (hereinafter, AF frame candidates) which correspond to the AF locations thereof. In one embodiment, the number of the selected AF frames (AF locations) is to be one or two. In other words, in a case where there are a plurality of AF frame candidates, the system control unit 50 selects and displays one or more AF frames (for example, one or two) from these AF candidate frames. This is because the interior of the object detection frame becomes complicated if there are many displayed AF frames. At that time, the system control unit 50 selects an AF frame to be superimposedly displayed, based on a relationship between a predetermined area (such as a pupil, nose, or mouth) being detected from a specific object (a face, for example) and an AF frame candidate, a priority order set in a predetermined area, a positional relationship with an object detection frame, or the like. Description is given below regarding an example of a method for selecting an AF frame to be displayed from AF frame candidates.

In a case where a plurality of AF frame candidates are found in the object detection frame surrounding the face detected by the face detecting function, if there is an AF frame candidate overlapping a pupil, nose, or mouth area detected by the organ detecting function, this AF frame candidate is prioritized and selected to be superimposedly displayed. Here, overlapping means that a predetermined area such as a pupil, nose, or mouth and at least a portion of an AF frame are overlapping. FIG. 5B illustrates a state in which one AF frame overlapping a pupil area is selected and displayed. Note, in a case where an AF frame candidate overlapping a pupil, nose, or mouth area does not exist, the system control unit 50 selects and displays an AF frame closest to the center of the screen from among the plurality of AF frame candidates that were found. Also, a priority order for a pupil, mouth, and nose is set and the system control unit 50 selects an AF frame in the pupil, mouth, and nose priority order. For example, in a case such as when the plurality of AF frame candidates include an AF frame overlapping a pupil area, an AF frame overlapping a nose area, and an AF frame overlapping a mouth area, the AF frame overlapping the pupil area is selected. Also, in a case where there are a plurality of the AF frame candidates overlapping with areas of one type of organ (pupil, for example), the system control unit 50 selects the AF frame closest to the center of the object detection frame.

Also, there may be an area on which the user wants to align focus for a physical object, such as a headlight of a car, for example. Configuration may be taken such that the system control unit 50 selects and displays an AF frame that overlaps an area on which the user wants to align focus. Note, determination of an area on which the user wants to align focus may be performed based on machine learning. Also, an area such as a headlight, for example, is detected by the image processing unit 20 using a template matching method. In FIG. 5C, the detected physical object is a vehicle and the AF frame 503 is displayed in the headlight area. Also, configuration may be taken such that in a case where two or more AF frames are to be selected and displayed, whether the object detection frame be a detection frame of a face or a detection frame of a physical object, only adjacent AF frames from among these AF frames are selected and displayed. In such a case, if there are not two or more adjacent AF frames, an AF frame closest to the center of the detection frame will be displayed, for example. This is in order to avoid the impression that the AF frames are displayed in a clutter.

Figure 6A:
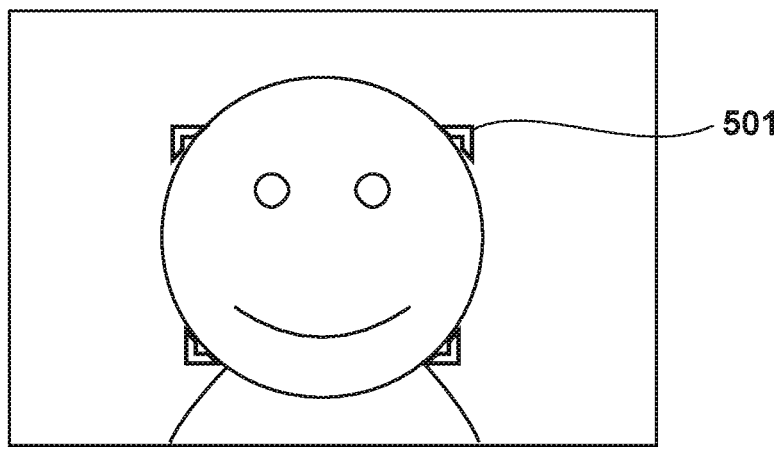
FIGS. 6A and 6B are schematic diagrams illustrating examples of screens in the embodiment.

The display to the image display unit 28 in step S309 is one of the above described (A) to (C) and is a display in a case where the defocus distance difference for the detected object is less than a predetermined value. In such a case, the system control unit 50 displays only an object detection frame on the image display unit 28. FIG. 6A illustrates an example of a display in the case of (A) or (B) (a case in which a face is detected as the object and the defocus distance difference is less than a predetermined value). Although the object detection frame 501 is displayed so as to surround the object, an AF frame is not displayed. This is because the defocus distance difference, in other words the depth difference, is less than a predetermined value for the area of the detected object, and the focus state does not change so much regardless of where the focus is detected in the detected object. According to the processing of step S306, step S308, and step S309 above, the system control unit 50 controls the display so as to superimposedly display both an object detection frame and an AF frame on the image display unit 28 in a case where the depth width is greater than or equal to a predetermined value. On the other hand, in a case where the depth width is less than the predetermined value, the system control unit 50 controls the display of the image display unit 28 so as superimposedly display the object detection frame, but not superimposedly display the AF frame.

Figure 6B:
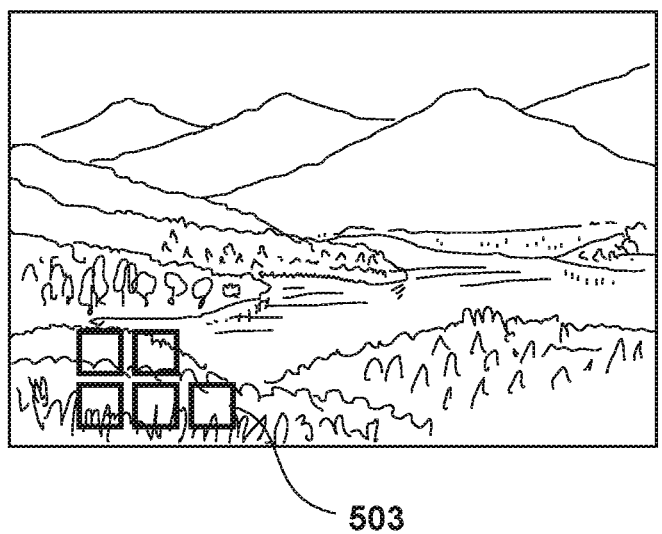

The display to the image display unit in step S310 is a display of a case where an object (face or physical object) is detected. In such a case, the system control unit 50 displays a plurality of AF frames to the image display unit 28 and does not display an object detection frame. FIG. 6B is a view illustrating an example of a display in a state in which neither a face nor a physical object is detected. The AF frames 503 indicating a plurality of AF locations are displayed at the closest position to the imaging plane within the screen. In step S311, the system control unit 50 performs focusing by using the AF location selected for the target of focus. In this way, the system control unit 50, in the shooting standby state, executes a focusing operation by using the AF location selected from the object detection frame of the images sequentially captured.

In step S312, the system control unit 50 determines whether or not the shutter switch 62 is in a half-pressed state, in other words, whether or not SW1 is in an ON state. In a case where it is determined that SW1 is ON (YES in step S312), the system control unit 50 advances the processing to step S313. If SW1 is not ON (NO in step S312), the system control unit 50 returns the processing to step S301 and repeats the above described processing. In step S313, the system control unit 50 performs more accurate focusing by using the AF location selected in the processing of any one of step S307 to step S310. After this, in step S314, the system control unit 50 determines whether or not the shutter switch 62 is in a full-pressed state, in other words, whether or not SW2 is in an ON state. In a case where it is determined that SW2 is ON (YES in step S314), the system control unit 50 advances the processing to step S315. If SW2 is not ON (NO in step S314), the system control unit 50 returns the processing to step S312. In step S315, the system control unit 50 controls driving of the image capturing element 14 so as to perform capturing of a still image, and thereby executes image capturing processing.

Note, in the processing of the continuous AF mode described in FIG. 3, configuration is taken such that even if the shutter switch 62 is not pressed, focus always continues to align to the object. By this, it is possible to quickly align focus in accordance with a half-press of the shutter switch 62 (SW1 turns ON). However, the continuous AF mode is not limited to this, and configuration may be taken such that focus continues to align to the object while the shutter switch 62 being half-pressed (while SW1 is ON), for example. In this case, the determination in step S301 of FIG. 3 is set to YES in a case where "continuous AF mode is ON and SW1 is ON", and the processing of step S312 and step S313 are omitted (processing is returned to step S301 in a case of NO in step S314).

As described above, by virtue of the above described embodiment, it is possible to provide a highly convenient image capturing apparatus that can reduce complexity within a screen by indicating an AF location only in scenes where the focus position is difficult to understand while showing the user the focus position.

In addition, although the disclosure was explained in detail based on suitable embodiments, the disclosure is not limited to these specific embodiments, and various forms in a scope that does not deviate from the gist of this disclosure are encompassed within the disclosure. Furthermore, each of the above described embodiments of the disclosure merely illustrates one embodiment and it is possible to combine embodiments as appropriate.

Furthermore, in the above described embodiments, a case where the disclosure is applied to a digital camera was described as an example, but limitation is not made to this example, and application to any electronic device including a touch panel and having image capturing function is possible. In other words, the disclosure can be applied to a mobile telephone terminal, a tablet PC, a PDA, and the like.

As described above, by virtue of the embodiment of the disclosure, it is possible perform a good visibility display in which the in-focus position is clear.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-138958, filed Jul. 29, 2019, which is hereby incorporated by reference herein in its entirety.

What is claimed is:

1. An apparatus, comprising:
at least one memory storing instructions; and
at least one processor that, upon executing the stored instructions, performs the functions of:
detecting, from a captured image, an object area in which a specific object is present;
calculating a depth width corresponding to difference of a plurality of defocus distances to the specific object at a plurality of portions in the detected object area; and
controlling a display so as to, in a case where the depth width is greater than or equal to a predetermined value, superimposedly display, on the image, an object detection frame for indicating the detected object area and an AF frame for indicating an AF location used by an auto focus, and, in a case where the depth width is less than a predetermined value, superimposedly display the object detection frame, and not superimposedly display the AF frame.

2. The apparatus according to claim 1, wherein the controlling the display includes, in a case where a specific part of the specific object is designated as a target of focusing by the auto focus and the specific part is detected from the detected object area of the image, superimposedly displaying a frame indicating the specific part irrespective of the depth width.

3. The apparatus according to claim 2, wherein the controlling the display includes superimposedly displaying in a state different to the AF frame, the frame indicating the specific part.

4. The apparatus according to claim 2, wherein the specific object is a face, and the specific part is a pupil.

5. The apparatus according to claim 1, wherein the controlling the display includes, in a case where a plurality of AF locations to be used for the auto focus are selected in the object detection frame, superimposedly displaying one or more AF frames among a plurality of AF frames corresponding to the plurality of AF locations.

6. The apparatus according to claim 5, wherein the controlling the display includes selecting and superimposedly displaying an AF frame, from among the plurality of AF frames, that is overlapping an area of a predetermined part detected from the specific object.

7. The apparatus according to claim 6, wherein the controlling the display includes, in a case where there is no AF frame that is overlapping the area of the predetermined part, selecting and superimposedly displaying the one or more AF frames from the plurality of AF frames in order from closest to farthest from the center of the object detection frame.

8. The apparatus according to claim 6, wherein the predetermined part includes a plurality of parts whose priority order is set, and the controlling the display includes selecting and superimposedly displaying one or more AF frames in order from an AF frame that is overlapping in an area of a part whose priority order is highest.

9. The apparatus according to claim 6, wherein the specific object is a face, and the predetermined part is an eye, a nose, or a mouth.

10. The apparatus according to claim 6, wherein the controlling the display includes selecting and superimposedly displaying one AF frame from the plurality of AF frames.

11. The apparatus according to claim 5, wherein the controlling the display includes selecting and superimposedly displaying two or more adjacent AF frames from the plurality of AF frames.

12. The apparatus according to claim 11, wherein the controlling the display includes, in a case where there are not two or more adjacent AF frames, selecting one AF frame closest to the center of the object detection frame.

13. The apparatus according to claim 1, wherein a focusing operation by using the AF location selected from the object detection frame of images sequentially captured in a shooting standby state is executed in the auto focus.

14. A method of controlling an apparatus having a function to perform auto focus, the method comprising:
  detecting, from a captured image, an object area in which a specific object is present;
  calculating a depth width corresponding to difference of a plurality of defocus distances to the specific object at a plurality of portions in the detected object area; and
  controlling a display so as to, in a case where the depth width is greater than or equal to a predetermined value, superimposedly displaying, on the image, an object detection frame for indicating the detected object area and an AF frame for indicating an AF location used by the auto focus, and, in a case where the depth width is less than a predetermined value, superimposedly displaying the object detection frame, and not superimposedly displaying the AF frame.

15. The method according to claim 14, wherein the controlling the display includes, in a case where a specific part of the specific object is designated as a target of focusing by the auto focus, and the specific part is detected from the detected object area of the image, the superimposedly displaying a frame indicating the specific part irrespective of the depth width.

16. The method according to claim 14, wherein the controlling the display includes, in a case where a plurality of AF locations to be used for the auto focus are selected in the object detection frame, selecting and, superimposedly displaying one or more AF frames among a plurality of AF frames corresponding to the plurality of AF locations.

17. A non-transitory computer-readable storage medium storing a program for causing a computer to execute a method of an apparatus having a function to perform auto focus, the method comprising:
  detecting, from a captured image, an object area in which a specific object is present;
  calculating a depth width corresponding to difference of a plurality of defocus distances to the specific object at a plurality of portions in the detected object area, the portions obtained by dividing the image; and
  controlling a display so as to, in a case where the depth width is greater than or equal to a predetermined value, superimposedly displaying, on the image, an object detection frame for indicating the detected object area and an AF frame for indicating an AF location used by the auto focus, and, in a case where the depth width is less than a predetermined value, superimposedly displaying the object detection frame, and not superimposedly displaying the AF frame.

18. The non-transitory computer-readable storage medium according to claim 17, wherein the controlling the display includes, in a case where a specific part of the specific object is designated as a target of focusing by the auto focus and the specific part is detected from the detected object area of the image, superimposedly displaying a frame indicating the specific part irrespective of the depth width.

19. The non-transitory computer-readable storage medium according to claim 17, wherein the controlling the display includes, in a case where a plurality of AF locations to be used for the auto focus are selected in the object detection frame, selecting and superimposedly displaying one or more AF frames among a plurality of AF frames corresponding to the plurality of AF locations.

* * * * *